United States Patent
Tinkler et al.

(10) Patent No.: US 9,173,519 B2
(45) Date of Patent: Nov. 3, 2015

(54) METHOD AND APPARATUS FOR BEVERAGE CARAFE DETECTION

(71) Applicant: Keurig Green Mountain, Inc., Waterbury, VT (US)

(72) Inventors: Ian Tinkler, Wakefield, MA (US); James E. Shepard, Marblehead, MA (US); Gregory Hurley, Dracut, MA (US); Matthew Johnsen, Ipswich, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 104 days.

(21) Appl. No.: 14/158,191

(22) Filed: Jan. 17, 2014

(65) Prior Publication Data

US 2015/0201795 A1 Jul. 23, 2015

(51) Int. Cl.
| | | |
|---|---|---|
| *B65B 1/04* | (2006.01) | |
| *A47J 31/46* | (2006.01) | |
| *B67D 1/08* | (2006.01) | |
| *B67D 1/12* | (2006.01) | |
| *A47J 31/44* | (2006.01) | |
| *B67D 3/00* | (2006.01) | |

(52) U.S. Cl.
CPC .............. *A47J 31/46* (2013.01); *A47J 31/4482* (2013.01); *B67D 1/0894* (2013.01); *B67D 1/124* (2013.01); *B67D 1/1234* (2013.01); *B67D 3/009* (2013.01)

(58) Field of Classification Search
CPC .... A47J 31/46; A47J 31/4482; B67D 1/0894; B67D 1/124; B67D 1/1234; B67D 3/009
USPC .................... 141/351, 360, 94, 369
See application file for complete search history.

(56) References Cited

U.S. PATENT DOCUMENTS

| | | | |
|---|---|---|---|
| 2,445,591 | A | 7/1948 | Sullivan |
| 2,667,566 | A | 1/1954 | Huck et al. |
| 3,291,034 | A | 12/1966 | Sohn et al. |
| 4,202,387 | A | 5/1980 | Upton |
| 4,833,978 | A | 5/1989 | Martone et al. |
| 4,997,015 | A | 3/1991 | Johnson |
| 5,094,153 | A | 3/1992 | Helbling |

(Continued)

FOREIGN PATENT DOCUMENTS

| | | |
|---|---|---|
| CN | 2636781 Y | 9/2004 |
| CN | 2692634 Y | 4/2005 |

(Continued)

OTHER PUBLICATIONS

International Search Report and Written Opinion for International Application No. PCT/US2015/011524 mailed Mar. 26, 2015.

*Primary Examiner* — Jason K Niesz
(74) *Attorney, Agent, or Firm* — Wolf, Greenfield & Sacks, P.C.

(57) ABSTRACT

A beverage forming method and system in which a carafe with an associated magnetic element is positionable at a carafe receiving area. One of a protrusion and a first recess is associated with the carafe and the other of the protrusion and the first recess is associated with a housing. The housing includes a detector arranged to detect the presence of the magnetic element when the protrusion is inserted into the first recess. Beverage formation of an amount greater than a threshold volume is enabled when the detector detects the magnetic element.

31 Claims, 14 Drawing Sheets

(56) References Cited

U.S. PATENT DOCUMENTS

| | | | |
|---|---|---|---|
| 5,158,793 A | 10/1992 | Helbling | |
| 5,183,998 A | 2/1993 | Hoffman et al. | |
| 5,287,795 A | 2/1994 | Enomoto | |
| 5,404,794 A | 4/1995 | Patel et al. | |
| 5,503,060 A | 4/1996 | Morecroft et al. | |
| 5,718,162 A | 2/1998 | Hoover | |
| 5,718,163 A | 2/1998 | Termini | |
| 5,782,163 A | 7/1998 | Chang | |
| 5,980,965 A | 11/1999 | Jefferson, Jr. et al. | |
| 6,047,630 A | 4/2000 | Brown et al. | |
| 6,050,175 A | 4/2000 | Mirand et al. | |
| 6,070,771 A | 6/2000 | Hart et al. | |
| 6,089,409 A | 7/2000 | Hart et al. | |
| 6,227,101 B1 | 5/2001 | Rabadi et al. | |
| 6,279,459 B1 | 8/2001 | Mork et al. | |
| 6,393,966 B1 | 5/2002 | Hart et al. | |
| 6,401,729 B1 | 6/2002 | Ford | |
| 6,504,481 B2 | 1/2003 | Teller | |
| 6,705,208 B2 | 3/2004 | Lassota | |
| 6,971,546 B2 | 12/2005 | Costa | |
| 7,024,983 B2 | 4/2006 | Grant et al. | |
| 7,223,427 B2 | 5/2007 | Knepler | |
| 7,439,859 B2 | 10/2008 | Humphrey | |
| 7,503,253 B2 | 3/2009 | Rahn | |
| 7,533,602 B2 | 5/2009 | Fukushima et al. | |
| 7,637,205 B2 | 12/2009 | Greiwe et al. | |
| 7,673,555 B2 | 3/2010 | Nosler et al. | |
| 7,673,556 B2 | 3/2010 | Spencer | |
| 7,698,992 B2 | 4/2010 | Wei | |
| 7,768,396 B2 | 8/2010 | Teller | |
| 7,891,287 B2 | 2/2011 | Miller | |
| 7,950,578 B2 | 5/2011 | Majer | |
| 8,056,468 B2 | 11/2011 | De'Longhi | |
| 8,516,948 B2 | 8/2013 | Zimmerman et al. | |
| 8,534,187 B2 | 9/2013 | Hart et al. | |
| 2003/0051767 A1* | 3/2003 | Coccaro et al. | 141/351 |
| 2003/0071806 A1 | 4/2003 | Annand | |
| 2005/0247206 A1 | 11/2005 | Lyall, III et al. | |
| 2006/0144244 A1 | 7/2006 | Girard et al. | |
| 2007/0169633 A1 | 7/2007 | Beesley et al. | |
| 2008/0041233 A1 | 2/2008 | Bunn | |
| 2008/0148954 A1 | 6/2008 | Maldanis | |
| 2008/0223217 A1 | 9/2008 | Teller et al. | |
| 2008/0314255 A1 | 12/2008 | Lee | |
| 2010/0011964 A1 | 1/2010 | White et al. | |
| 2010/0018403 A1 | 1/2010 | Hoare et al. | |
| 2010/0083841 A1 | 4/2010 | Bergeron et al. | |
| 2010/0200110 A1 | 8/2010 | Segiet et al. | |
| 2011/0052766 A1 | 3/2011 | Knepler | |
| 2011/0100228 A1 | 5/2011 | Rivera | |
| 2011/0185907 A1 | 8/2011 | De'Longhi | |
| 2011/0315020 A1 | 12/2011 | Stürcken et al. | |
| 2013/0118639 A1 | 5/2013 | Springer | |
| 2013/0160653 A1 | 6/2013 | McCormick et al. | |
| 2013/0164422 A1* | 6/2013 | McCormick et al. | 426/433 |

FOREIGN PATENT DOCUMENTS

| | | |
|---|---|---|
| CN | 201026129 Y | 2/2008 |
| DE | 3736517 C1 | 11/1988 |
| DE | 41 03 820 A1 | 10/1991 |
| DE | 20 2006 012 326 U1 | 12/2006 |
| DE | 20 2008 015 525 U1 | 3/2009 |
| DE | 10 2010 023 668 A1 | 12/2010 |
| JP | 2679364 | 11/1997 |
| JP | 2000033045 A | 2/2000 |
| WO | WO 2004/024615 A1 | 3/2004 |
| WO | WO 2005/048794 A1 | 6/2005 |
| WO | WO 2007/023116 A1 | 3/2007 |
| WO | WO 2007/023117 A1 | 3/2007 |
| WO | WO 2009/111742 A2 | 9/2009 |
| WO | WO 2011/012513 A1 | 2/2011 |
| WO | WO 2012/097403 A1 | 7/2012 |

* cited by examiner

METHOD AND APPARATUS FOR BEVERAGE CARAFE DETECTION

FIELD

This invention relates to beverage forming systems, such as systems for carbonating liquids and/or mixing liquids with a beverage medium to form a beverage.

BACKGROUND

Beverage forming systems that use a liquid, such as water, to form a beverage are well known. For example, U.S. Patent Application Publication 2011/0185907 discloses a coffee machine and receptacle that can be docked at a filling position on the machine to receive coffee made by the machine. The machine can detect the presence of the receptacle at the filling position, and starts an operating mode to produce coffee when the receptacle is at the filling position.

SUMMARY

In some embodiments, a beverage forming apparatus may be configured to dispense different volumes of liquid depending upon whether a carafe is positioned at a carafe receiving area. In some embodiments, the beverage forming machine dispenses a volume greater than a threshold volume when a carafe with an associated magnetic element is placed at the carafe receiving area and a detector detects the presence of the magnetic element. When the detector does not detect the magnetic element, the apparatus is configured to dispense only beverage volumes less than the threshold volume. As a result, aspects of the invention provide for a more convenient and more versatile system, e.g., because the apparatus is configured to dispense different volumes of beverage depending upon whether the carafe is at the carafe receiving area. Moreover, undesired dispensing of large volumes of beverages (e.g., amounts greater than the threshold volume) without the presence of the carafe at the carafe receiving area may be prevented as the apparatus is configured to only dispense volumes of beverages less than the threshold volume when the carafe is not detected.

According to one aspect, a beverage forming apparatus is disclosed. The apparatus includes a beverage carafe having a body defining an interior space for holding a beverage, an opening through which the beverage is dispensable into the interior space, and a magnetic element associated with a lower portion of the carafe. The apparatus also includes a housing having a carafe receiving area to receive the carafe and in which the carafe is associated with the housing to receive the beverage dispensed into the opening. A protrusion may be associated with a lower side portion of one of the carafe and the housing. A first recess for receiving the protrusion may be formed in the other of the carafe and the housing. A detector may be arranged to detect the presence of the magnetic element when the protrusion is inserted into the recess. A beverage forming station may be supported by the housing and arranged to combine a precursor liquid with a beverage material to form the beverage that is dispensed into the carafe at the carafe receiving area. A liquid supply system may be supported by the housing for providing precursor liquid to the beverage forming station. A control circuit may be arranged to control the liquid supply system to deliver precursor liquid to the beverage forming station to dispense more than a threshold volume of beverage (e.g., between about 8-20 ounces of beverage), only when the detector detects the magnetic element.

In some embodiments, the engagement between the protrusion and the first recess sets the rotational position of the carafe. In some embodiments, the carafe includes a circular opening at the top of the body and a cover arranged over the circular opening, the cover having a surface with the opening into which the beverage is dispensed. The engagement between the protrusion and the first recess may allow for alignment of the opening below the outlet through which the beverage is dispensed. As a result, aspect of the invention may provide greater control during beverage formation, e.g., because the beverage is only dispensible into the carafe in an amount greater than the threshold volume when the magnetic element is detected and the protrusion is in the recess, the opening is positionable below the outlet during beverage formation. This may allow the opening to be smaller (e.g., less than about 2 cm in diameter), which, in turn, may allow the carafe to maintain the temperature of the beverage (hot or cold) for a longer period of time.

In some embodiments, the apparatus includes a drip tray arranged to engage with the housing at the carafe receiving area. In some embodiments, the carafe is positionable at the carafe receiving area to receive a volume of beverage greater than the threshold volume only when the drip tray is removed. In other embodiments, the carafe may be positionable at the receiving area (e.g., by placement on the drip tray) and may receive a volume of beverage less than the threshold volume. In some embodiments, the drip tray is only engageable with the housing when the carafe is not at the carafe receiving area. In some embodiments, the drip tray includes at least one engagement feature to engage with the housing. In embodiments in which the first recess is associated with the housing, the at least one engagement feature may include a tab that extends from the drip tray and that has a different shape than the protrusion.

In some embodiments, the housing includes the first recess for receiving the protrusion and a second recess for receiving the at least one engagement feature. In such an embodiment, the first recess may be located below the second recess (e.g., the location in which the protrusion is received is located below the location in which the at least one engagement feature is received).

According to another aspect, a method for controlling a beverage forming apparatus having a housing including a carafe receiving area to receive a carafe and one of a first recess and a protrusion associated with an exterior surface of the housing is disclosed. The method includes placing a carafe at the carafe receiving area, the carafe having a body defining an interior space for holding a beverage, an opening through which a beverage is dispensable into the interior space, the other of the first recess and the protrusion associated with a lower side portion of the carafe, and a magnetic element associated with a lower portion of the carafe. The method also includes inserting the protrusion into the first recess and detecting the presence of the magnetic element. In some embodiments, the liquid supply system is controlled to deliver a precursor liquid to a beverage forming station to dispense more than a threshold volume of beverage only when a detector detects the magnetic element. The liquid supply system also may be controlled to deliver precursor liquid to the beverage forming station to dispense only less than the threshold volume of beverage when the detector does not detect the magnetic element. In some embodiments, the threshold volume is about 8 ounces of beverage.

In still another embodiment, a beverage forming apparatus is disclosed. The apparatus includes a beverage carafe having a body defining an interior space for holding a beverage, and an opening through which the beverage is dispensable into the interior space. The apparatus further includes a housing having a carafe receiving area to receive the carafe and in which the carafe is associated with the housing to receive the beverage dispensed into the opening. A detector may be arranged to detect the presence of the carafe when the carafe is at the carafe receiving area. A beverage forming station may be supported by the housing and arranged to combine a precursor liquid with a beverage material to form the beverage that is dispensed from an outlet at the carafe receiving area. A liquid supply system may be supported by the housing for providing precursor liquid to the beverage forming station. A control circuit may be arranged to control the liquid supply system to deliver precursor liquid to the beverage forming station to dispense more than a threshold volume of beverage only when the detector detects the carafe, and may be arranged to control the liquid supply system to deliver precursor liquid to the beverage forming station to dispense only less than the threshold volume of beverage when the detector does not detect the carafe. In some embodiments, the threshold volume is about 8 ounces of beverage. In some embodiments, the apparatus includes a drip tray that is positionable at the carafe receiving area, the carafe only being detectable by the detector at the carafe receiving area if the drip tray is removed from the carafe receiving area. In some embodiments, the carafe includes a protrusion that extends from the carafe body, the housing includes a first recess arranged to receive the protrusion, and the detector is arranged to detect the carafe only when the protrusion is received in the first recess. In other embodiments, the housing includes a protrusion that extends from the housing, the carafe includes a recess arranged to receive the protrusion, and the detector is arranged to detect the carafe only when the protrusion is received in the recess.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
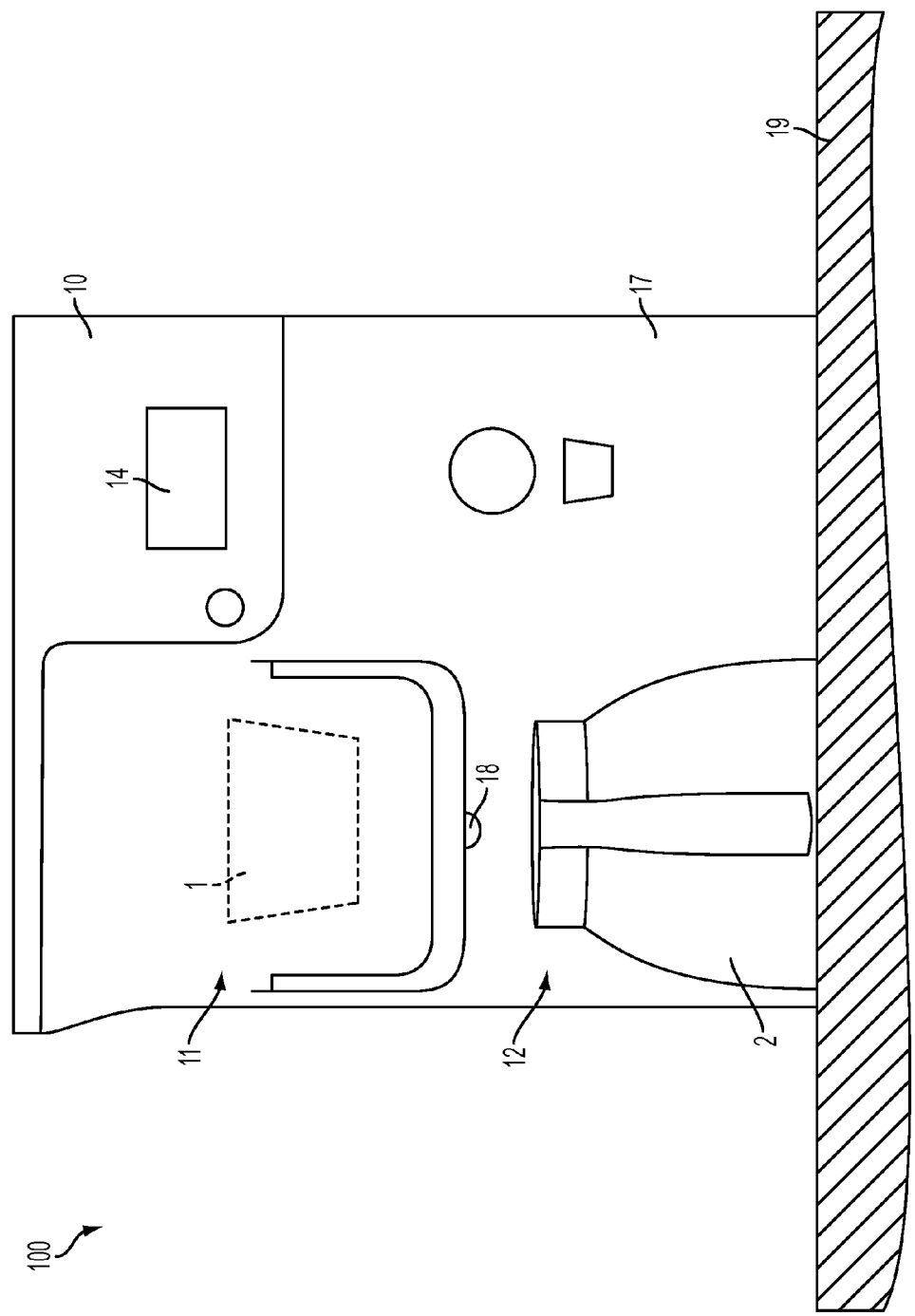
FIG. 1 is a front view of a beverage forming apparatus with a carafe located at a carafe receiving area of a beverage forming machine according to one embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe includes any suitable container arranged to receive a dispensed beverage.) If used, the cartridge 1 may be manually or automatically placed in a beverage forming station 11 of a beverage forming machine 10. For example, the beverage forming station 11 may include a cartridge receiver that is exposed to receive the cartridge 1 when the user operates a handle or other actuator. With the cartridge 1 placed in the cartridge receiver, the actuator may be operated to at least partially enclose the cartridge 1, e.g., so that water or another precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

In one embodiment, the beverage forming machine 10 includes a housing 17 that houses and supports components of the machine 10, such as a user interface 14 used to control system operation, and defines a carafe receiving area 12 at which the carafe 2 is positionable to receive the beverage dispensed by the machine 10. Thus, at the carafe receiving area 12, the carafe 2 is associated with the machine 10 to receive a dispensed beverage and may be supported by the housing 17. As can be seen in FIG. 1, the machine 10 may be placed on a surface 19 (e.g., a kitchen counter), and when the carafe 2 is placed at the carafe receiving area 12, the carafe 2 also may be positioned on the surface 19.

Figure 2:
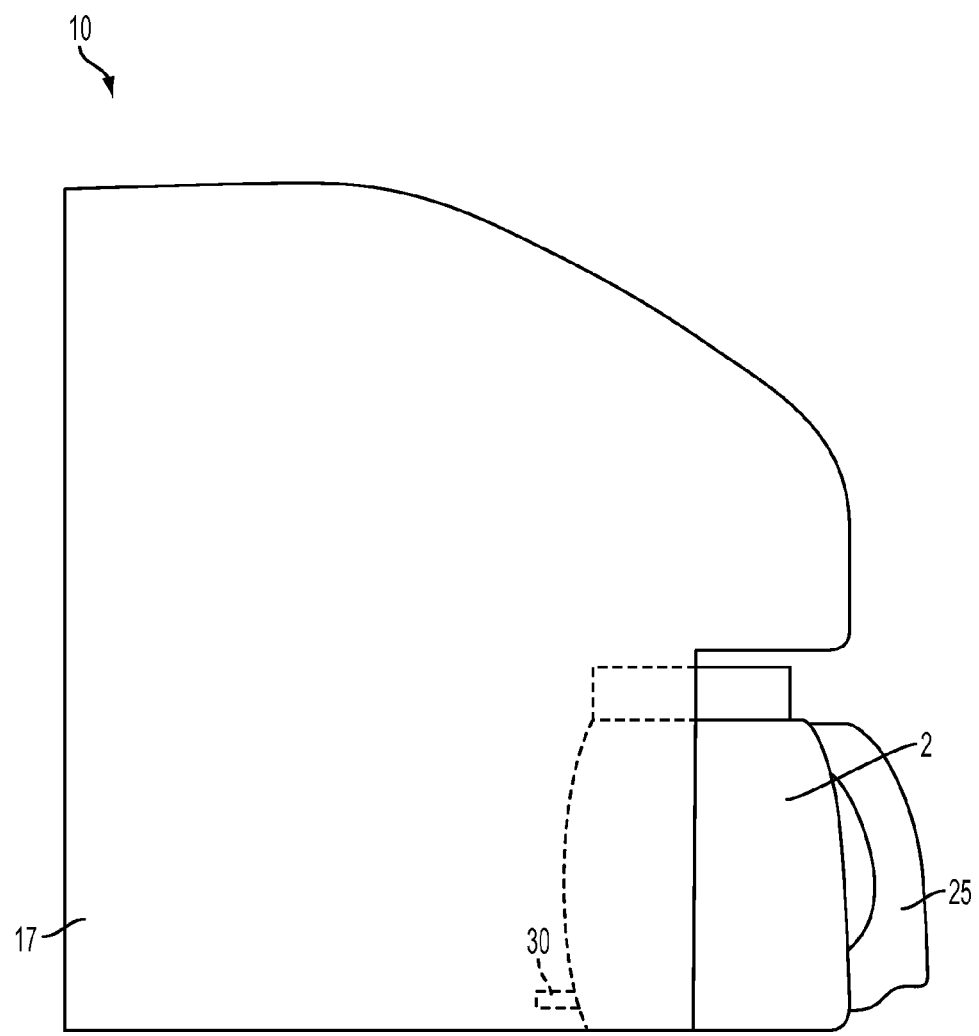
FIG. 2 is a left side view of an apparatus according to one embodiment.
Figure 3:
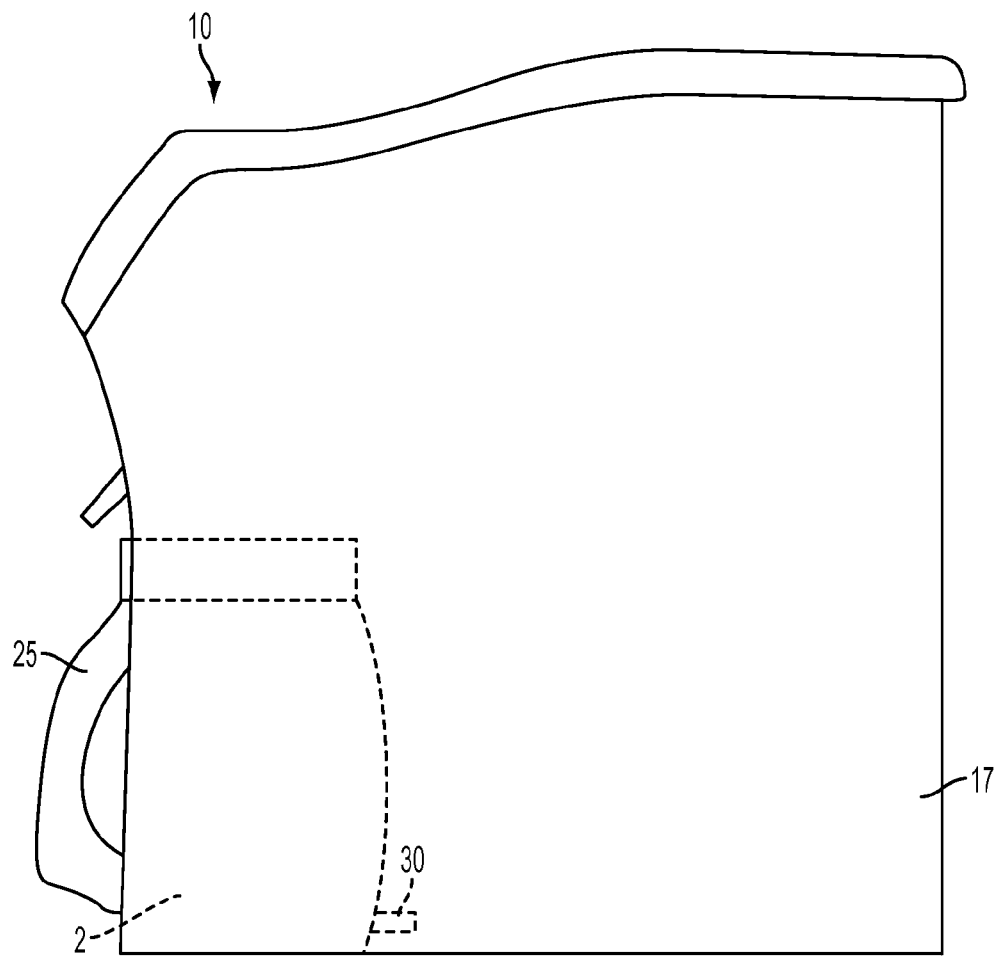
FIG. 3 is a right side view of an apparatus according to one embodiment.

As illustrated in FIG. 2, the carafe 2 may be received at the carafe receiving area 12 so that the carafe 2 is at least partially surrounded by the housing 17. A person having ordinary skill in the art should appreciate that the housing 17 may be configured such that the carafe 2 is more or less exposed when at the carafe receiving area 12. In FIG. 3, for example, the housing 17 is configured such that the carafe 2 is less exposed at the carafe receiving area 12.

Figure 4:
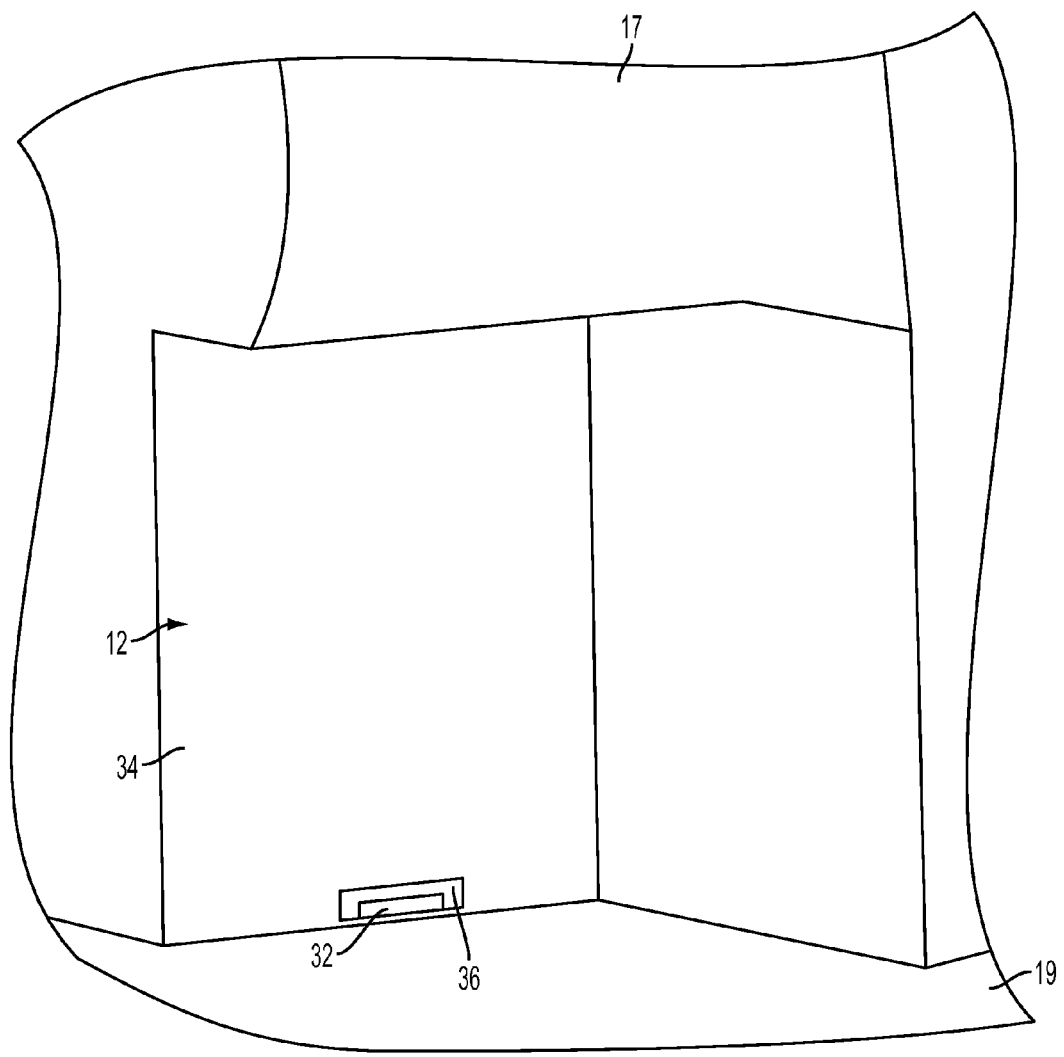
FIG. 4 is a perspective view of a carafe receiving area according to one embodiment.

According to one aspect, the housing 17 is configured to engage with the carafe 2. In some embodiments, as is shown in FIG. 4, the housing has a first recess 32 in an exterior surface 34 of the housing 17 for engaging with the carafe 2. As shown in this figure, the first recess 32 may be formed in a lower portion of the exterior surface 34, adjacent the carafe receiving area 12. A person having ordinary skill in the art should appreciate that first recess 32 may be located in any suitable portion of the housing 17 as this aspect of the disclosure is not limited in this regard. A person having ordinary skill in the art should further appreciate that the first recess 32 may have any shape or size suitable for engaging with the carafe 2.

Figure 11B:
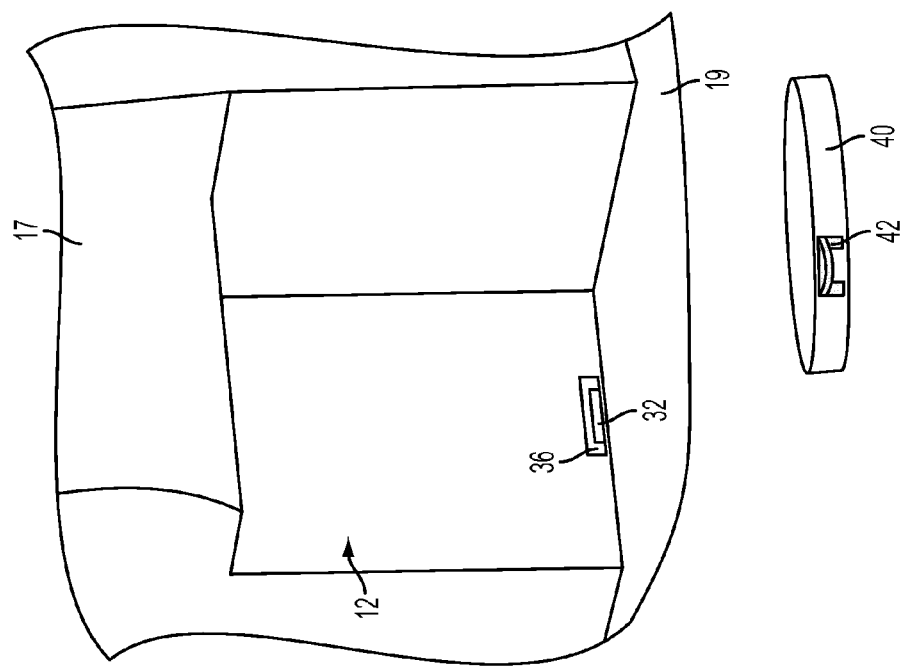
FIG. 11B is the FIG. 11A embodiment with the drip tray disengaged from a housing.
Figure 11A:
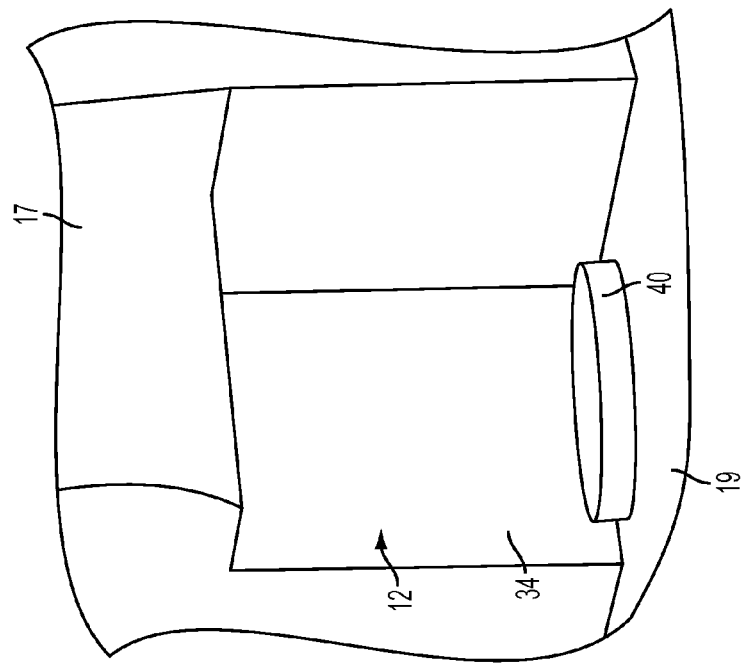
FIG. 11A is perspective view of a drip tray engaged with a housing according to one embodiment.

In some embodiments, the housing has a second recess 36 for engaging with a drip tray 40 (see FIGS. 11A and 11B). As with the first recess 32, the second recess 36 may be formed in a lower portion of the housing 17, although the second recess 36 also may be formed in another suitable portion of the housing for engaging with the drip tray 40. In some embodiments, the second recess 36 is formed in the exterior surface 34 of the housing 17, adjacent the carafe receiving area 12. In some embodiments, the second recess 36 is formed above the first recess 32. A person having ordinary skill in the art should appreciate that although the second recess 36 is shown adjacent to the first recess 32 in FIG. 4, in other embodiments, the first and second recesses 32, 36 may be separated from one another. A person having ordinary skill in the art also should appreciate that the second recess 36 may have any shape or size suitable for engagement with the drip tray. The shape and size of the second recess 36 may be the same as the shape and size of the first recess 32, although the shape and size of the first and second recesses 32, 36 also may be different.

Figure 5:
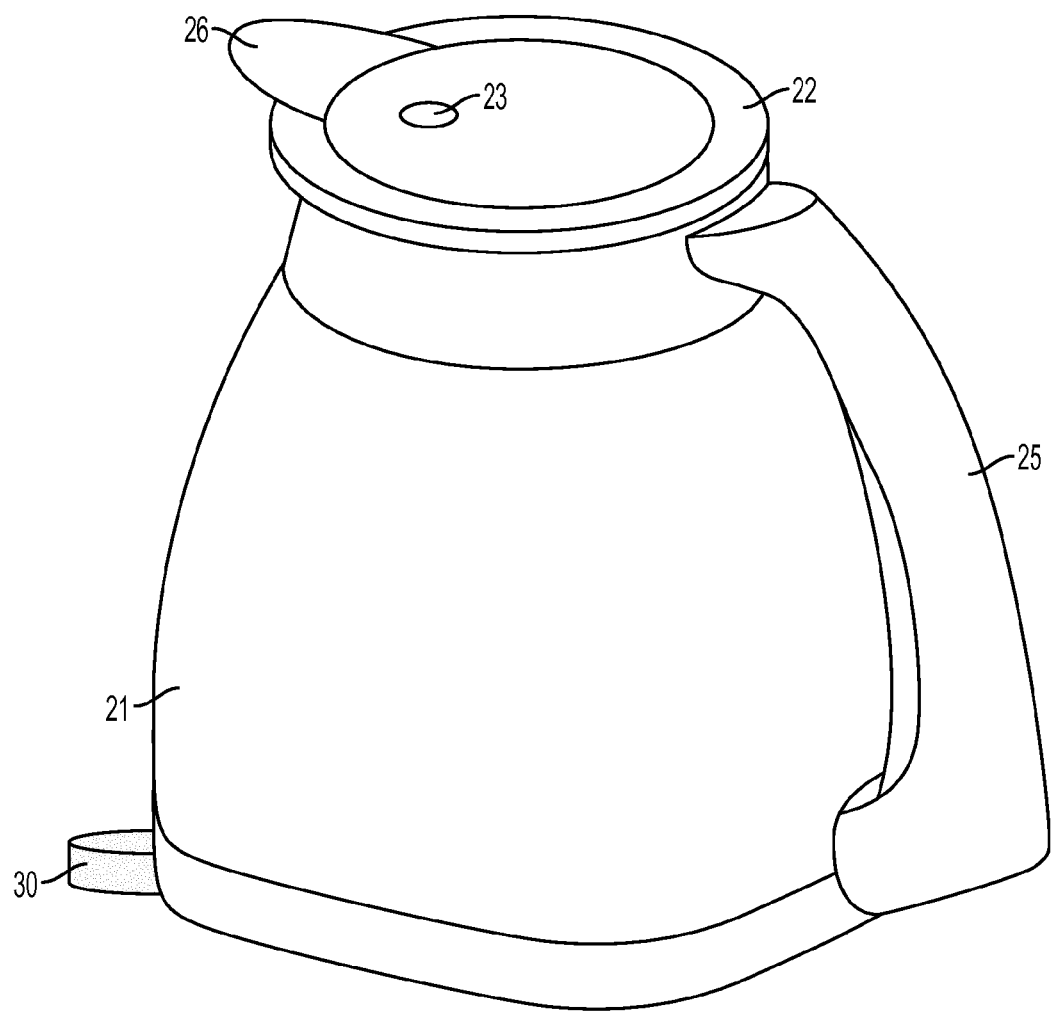
FIG. 5 is a perspective view of a carafe according to one embodiment.

FIG. 5 shows a perspective view of a carafe 2 according to one embodiment. As is shown in this figure, the carafe 2 may include a body 21 that defines an interior space that holds a beverage. The body 21 may be shaped, formed or otherwise constructed in any suitable way and of any suitable material or combination of materials. For example, the body 21 may be formed of a molded plastic material, metal, or other, and may be insulated or not.

Figure 6:
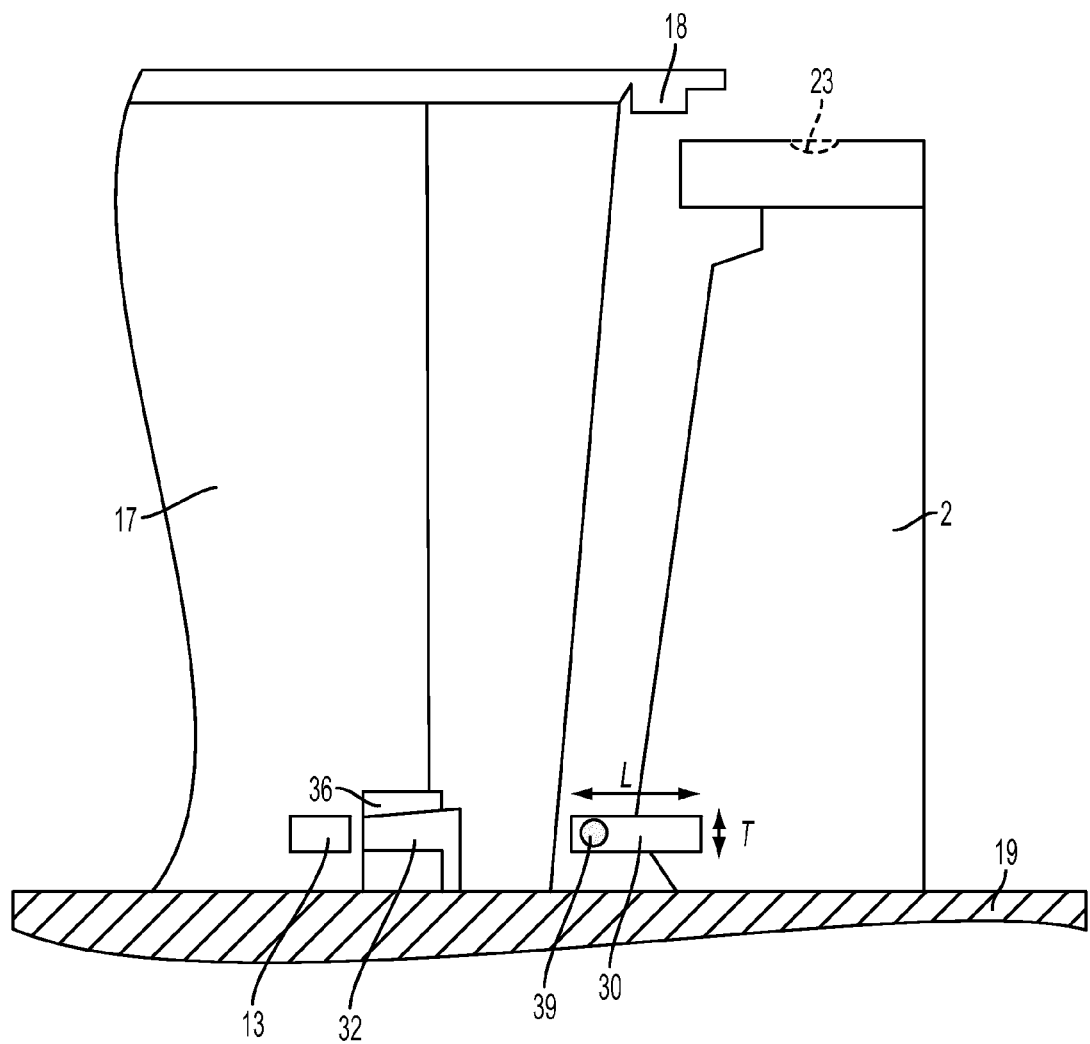
FIG. 6 is a schematic side view of a beverage forming apparatus according to one embodiment.

In some embodiments, as is shown in FIGS. 5 and 6, the carafe has a protrusion 30 associated with the carafe 2 for engagement with the housing 17 when the carafe 2 is at the carafe receiving area 12. The protrusion 30 may be associated with a bottom side portion of the carafe 2, as is shown in FIG. 5, although the protrusion 30 also may be associated with any suitable portion of the carafe 2. For example, the protrusion 30 may be associated with the body 21, the handle 25, and/or the cover 22. In at least some embodiments, the location of the protrusion 30 on the carafe 2 corresponds to the location of the first recess 32 on the housing, e.g., the protrusion 30 is located at a same height above a bottom of the carafe 2 as the first recess 32 is located above a bottom of the machine 10. Thus, the protrusion 30 and first recess 32 may be located at a same height above the surface 19 on which the machine 10 and carafe 2 are supported. In some embodiments, the first recess 32 is located at the bottom of the machine 10 and both the carafe 2 and the protrusion 30 are supported on the surface 19.

A person having ordinary skill in the art should appreciate that although only one protrusion 30 is shown in FIG. 5, the carafe 2 may have more than one associated protrusion 30. In embodiments having more than one protrusion, the housing 17 may have more than one corresponding first recess 32 to engage with the protrusions 30. A person having skill in the art should also appreciate that although all the protrusions may be associated with the same portion of the carafe 2 (e.g., with the bottom side portion of the carafe), the protrusions also may be associated with different portions (e.g., with the body and with the bottom side portion).

In some embodiments, the protrusion 30 is removably attachable to the carafe 2. For example, in one embodiment, the protrusion 30 may be magnetically connected to the carafe 2. In such an embodiment, the protrusion 30 may be connected to the carafe 2 for engagement with the housing and then disconnected from the carafe after beverage formation (e.g., for serving the beverage). The protrusion 30 also may be connectable to the carafe 2 via an interface (e.g., via a harness that removably attaches to the carafe 2). In some embodiments, the protrusion 30 is permanently attached to the carafe 2. A person having ordinary skill in the art should appreciate that the protrusion 30 may be attached to the carafe 2 via any suitable method (e.g., via fasteners or via screws). A person having ordinary skill the art also should appreciate that the carafe 2 may be formed or otherwise constructed such that the protrusion 30 is fixed or integral with the carafe 2.

Figure 7:
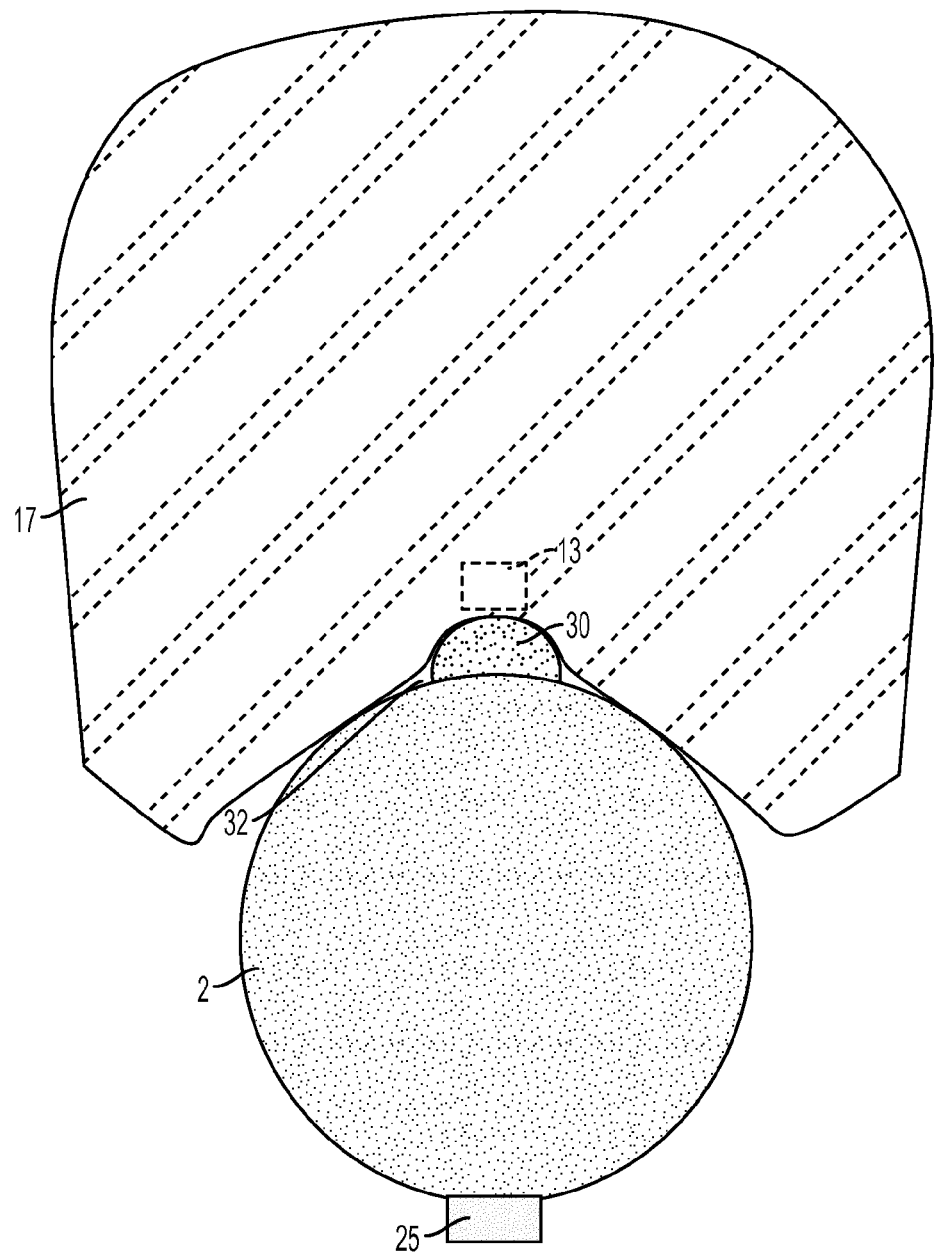
FIG. 7 is a bottom view of a beverage forming apparatus with a carafe located at a carafe receiving area of a beverage forming machine according to one embodiment.

The protrusion 30 may be shaped, formed or otherwise constructed in any suitable way and of any suitable material. In some embodiments, as is shown in FIG. 7, which is a bottom view of the apparatus 100 with the carafe 2 at the carafe receiving area 12, the protrusion 30 has a curved shape, e.g., in the form of a partial disc element. The protrusion also may be circular, semicircular, or any other suitable shape as this aspect of the disclosure is not limited in this regard. For example, the protrusion 30 also may have a square, triangular, or rectangular shape. In some embodiments, the shape of the protrusion 30 corresponds to the shape of the first recess 32. As seen in FIG. 7, for example, in some embodiments there is precise contact geometry between the protrusion 30 and the first recess 32 when the carafe 2 is at the carafe receiving area 12 (e.g., when the protrusion 30 is fully received by the first recess 32).

The protrusion also may have any suitable size as this aspect of the disclosure is not limited in this regard. In some embodiments, as is shown in FIG. 6, the protrusion 30 may have a thickness T. In some embodiments, the thickness T of the protrusion is less than about 3 cm. Other suitable thicknesses T of the protrusion 30 may be used for engaging the carafe 2 with the housing 17. In some embodiments, the protrusion has a length L (or, for protrusions having a circular or semicircular shape, a radius R). In some embodiments, the length L of the protrusion is larger than the thickness T of the protrusion. In some embodiments, the size and thickness T of the protrusion corresponds to the size and thickness of the first recess 32.

According to another aspect, the protrusion 30 may be configured to notify the apparatus 100 of the presence of the carafe 2 at the carafe receiving area 12. In some embodiments, the protrusion includes a magnetic element configured to alert the presence of the carafe 2. In one embodiment, as is shown in FIG. 6, the protrusion 30 includes a magnet 39. In some embodiments, the magnet 39 is embedded in the protrusion 30, although the magnet 39 also may be attachable to an outer surface of the protrusion 30. The protrusion 30 also may be formed of or coated with a magnetic material, or may be formed of steel or another suitable material that may be magnetized. A person having ordinary skill in the art should appreciate that the protrusion 30 also may be formed of other suitable materials or combination of materials or may include other components suitable for notifying the apparatus 100 of the presence of the carafe 2 at the carafe receiving area 12.

In some embodiments, the apparatus 100 includes a detector 13 that is arranged to detect the presence or absence of the carafe 2 at the carafe receiving area 12. In some embodiments, the carafe 2 cannot be detected at the carafe receiving area 12 when the drip tray 40 is engaged with the housing 17. In some embodiments, when the drip tray 40 is engaged with the second recess 36, the drip tray 40 blocks access to the first recess 32 (e.g., the protrusion cannot be received by the first recess 32).

In some embodiments, the detector 13 is configured to detect the presence of the magnetic element. The detector 13 may be located adjacent to the exterior surface of the first recess 32. The detector also may be positioned inside the housing 17, or may be embedded in the exterior surface 34 of the housing or in an exterior wall of the first recess 32. As shown in FIG. 7, although the apparatus includes only one detector 13, more than one detector 13 may be used for detecting the presence or absence of the magnetic element (and, thus, the carafe 2 at the carafe receiving area 12).

In some embodiments, the detector 13 detects the presence of the magnetic element of the protrusion 30 via a sensor. In one embodiment, the detector 13 includes a reed switch, although other suitable detectors may be used as this aspect of the disclosure is not limited in this regard. For example, in some embodiments, the detector 13 includes a hall effect sensor to detect the magnetic element. The detector 13 also may include an inductive, resistive, capacitive, or other sensor suitable for detecting the magnetic element as this aspect of the disclosure is not limited in this regard. In some embodiments, the detector 13 only detects the carafe 2 (e.g., the switch is only closed) when the protrusion 30 is fully inserted into the first recess 32 and the magnet 39 is in close proximity to the sensor 13.

A person having ordinary skill in the art should appreciate that detector 13 may have other arrangements for detecting the carafe 2. For example, in some embodiments, the detector 13 may include a switch that is mechanically actuated when the protrusion 30 is inserted into the first recess 32. In other embodiments, the detector 13 may detect the presence of an RFID tag or another component via radio frequency energy. The detector 13 also may include an optical sensor. Similarly, the carafe need not include a protrusion that is detected by the machine 10, but rather the carafe may include a recess that receives a protrusion of the machine (see, e.g., FIG. 14), or the carafe may include neither a protrusion nor a recess, e.g., may include a magnetic element embedded in the body of the carafe that is detected by the detector. Thus, the machine need not include a protrusion or recess, but may detect the presence and/or absence of the carafe without such features.

According to still another aspect, the apparatus 100 is configured to set the rotational position of the carafe 2 at the carafe receiving area 12, e.g., based on engagement of the carafe with the housing 17. As shown in FIG. 5, the body 21 of the carafe 2 defines a top opening that receives a cover 22. The cover 22 may be removable from the body 21, e.g., to allow easier cleaning of the interior space, and may engage the body 21 in any suitable way. For example, the cover 22 may have a cylindrical portion that fits within the top opening of the body 21 and one or more gaskets (such as an o-ring positioned on the cylindrical portion) may help provide a water-tight seal between the cover 22 and the body 21 when the cylindrical portion is fitted into the top opening. In another embodiment, the cover 22 may threadedly engage with the body 21, and may include a gasket (such as a rubber washer positioned between a rim of the body 21 at the top opening and the cover 22) that provides a seal when the cover 22 is tightened to the body 21.

Although the top of the body 21 may be suitable for receiving the beverage, in some embodiments, the cover 22 includes a beverage opening 23 through which the beverage is dispensed into interior space of the body 21. In some embodiments, the opening 23 is a small opening, although the opening may be any size suitable for allowing a beverage to be dispensed into the interior space of the body 21. For example, in some embodiments, the opening 23 has a size of less than about 2 cm, although the opening 23 may have other suitable sizes. In some embodiments, the body has a spout 26 configured to dispense the beverage from the interior space. As shown in FIG. 5, the opening 23 may be located near the spout in some embodiments, although the opening may be placed in any suitable portion of the cover 22 to allow the beverage to be dispensed into the interior space of the body 21. Although not shown, a person having ordinary skill in the art should appreciate the opening may have a lid that covers the opening 23 or is made as a plug that fits into the beverage opening and is removable from the opening 23.

Figure 8:
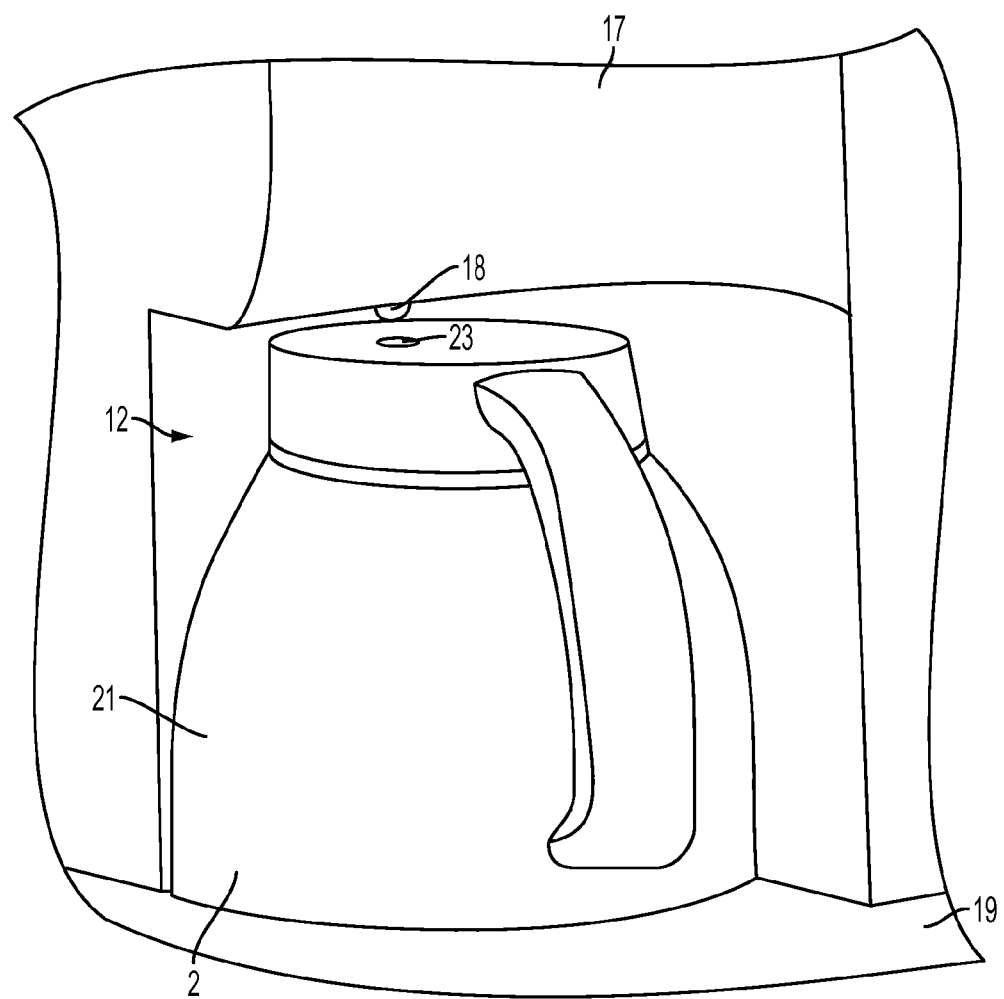
FIG. 8 is a perspective view of a carafe at a carafe receiving area according to one embodiment.

In some embodiments, as is shown in FIG. 8, the opening 23 is located in a portion of the cover 22 that corresponds with beverage outlet 18 of the housing 17. In one embodiment, the beverage opening 23 is positioned below the outlet 18 when the carafe 2 is at the carafe receiving area 12 and the protrusion 30 is inserted in the first recess 32.

In some embodiments, as is shown in FIGS. 7 and 8, precise contact geometry between the protrusion 30 and the first recess 32 aligns the opening 23 below the outlet 18. In some embodiments, engagement between the protrusion 30 and the first recess 32 sets the rotational position of the carafe 2 at the carafe receiving area 12. As used herein, engagement between the protrusion and the first recess may include reception of the protrusion by the first recess with or without contact between the protrusion and the first recess. For example, in some embodiments, the protrusion may be inserted into and received by the first recess without any physical interaction or contact between the protrusion and the first recess.

Figure 9:
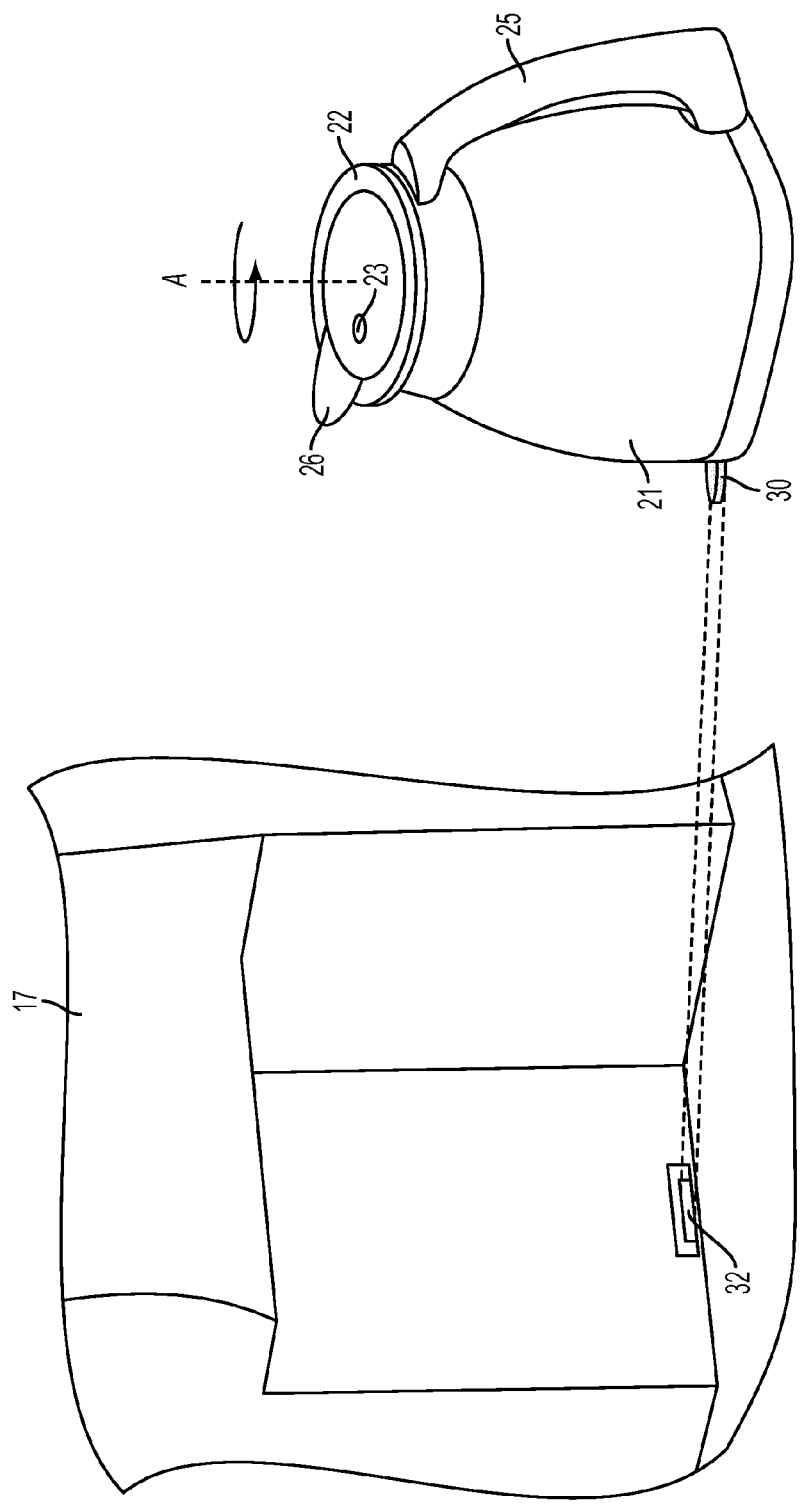
FIG. 9 is the FIG. 8 embodiment with the carafe disengaged from a housing.

As is shown in FIG. 9, when the carafe 2 is disengaged from the housing 17, the carafe 2 may rotate in any suitable direction (e.g., about an axis A). When the carafe 2 is placed at the carafe receiving area 12 and the protrusion 30 is inserted into the first recess 32, engagement between the protrusion 30 and the first recess 32 may limit the X and Y rotation of the carafe. This, in turn, may maintain the position of the opening 23 below the outlet 18 during beverage formation. As seen in FIG. 7, for example, when the protrusion 30 is received at the first recess 32 the rotational movement of the carafe at the carafe receiving area 12 is limited.

Figure 10:
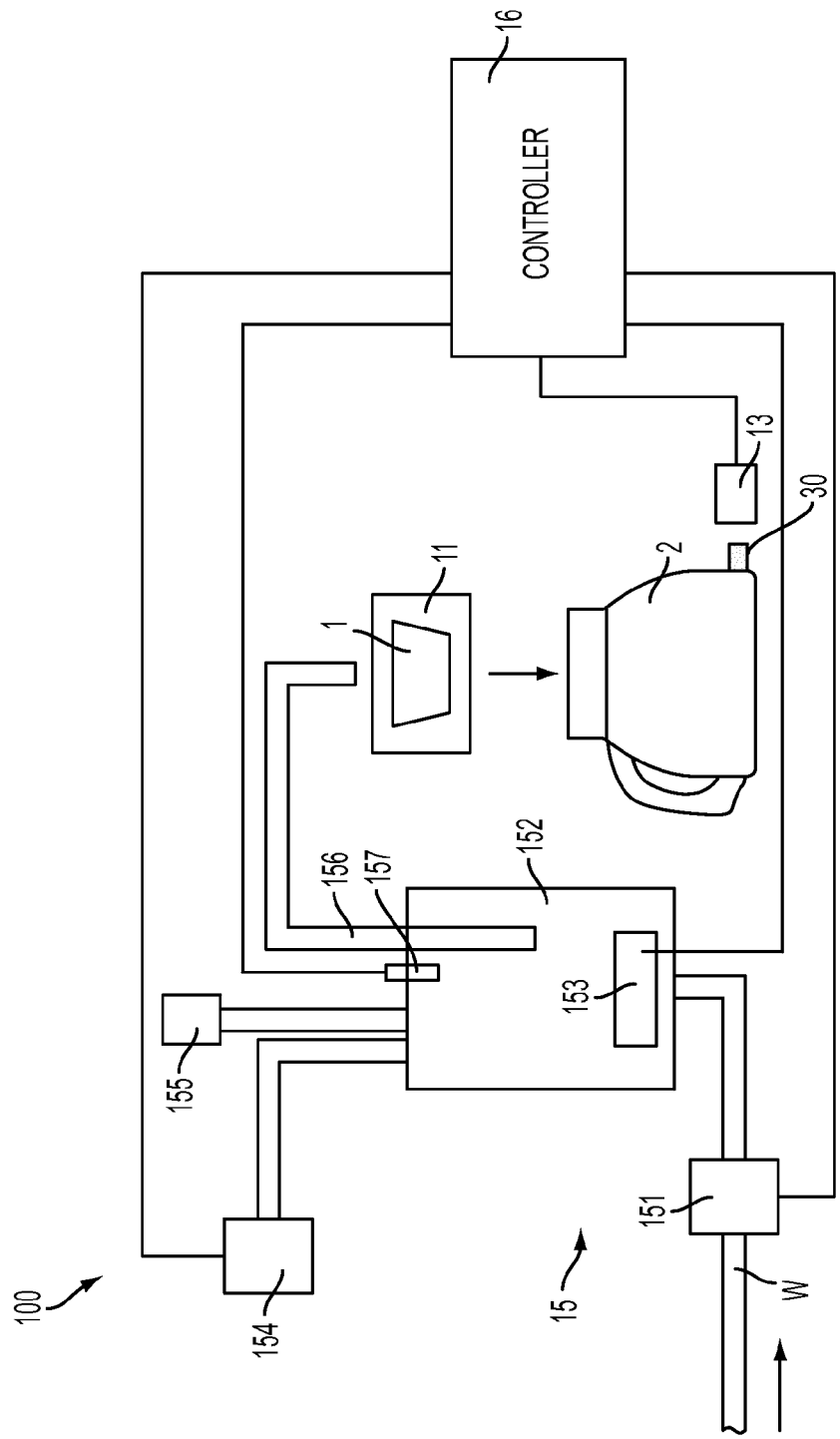
FIG. 10 is a schematic diagram of components of a beverage forming apparatus according to one embodiment.

FIG. 10 shows a schematic block diagram of various components that may be included in a beverage forming apparatus 100 in one embodiment. Those of ordinary skill in the art will appreciate that a beverage forming apparatus 100 may be configured in a variety of different ways, and thus aspects of the invention should not be narrowly interpreted as relating only to one type of beverage forming apparatus. Water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2. The liquid supply 15 in this embodiment includes a valve 151 that is coupled to a source W that provides liquid from a storage tank, a mains water supply or other source. The valve 151 is controlled by a control circuit 16 to open and close to provide a desired volume of liquid to a tank 152. For example, if the tank 152 is empty, the valve 151 may be opened until a conductive probe or other water level sensor 157 provides a signal to the control circuit 16 that indicates when liquid arrives near or at a top of the tank 152. In response to detecting liquid at the sensor 157, the control circuit 16 may close the valve 151. Of course, other arrangements for providing liquid to the tank 152 are possible, such as by a pump (e.g., a centrifugal pump, piston pump, solenoid pump, diaphragm pump, etc.). Other optional features, such as a vent 155 which can be opened or closed to vent the tank 152, a check valve or other flow controller that can prevent backflow in the conduit between the source W and the tank 152, or other features may be included. In this embodiment, the vent 155 is not controlled by the control circuit 16, but remains always open with an orifice of suitable size to allow venting for filling of the tank 152, and pressure buildup in the tank 152 to allow liquid delivery. Also, control of a volume of liquid provided to the tank 152 may be performed in other ways, such as opening the valve 151 for a defined period of time, running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or other system to otherwise condition the liquid. In this embodiment, liquid in the tank 152 may be dispensed via a conduit 156 to the beverage forming station 11. The liquid may be discharged from the tank 152 by an air pump 154 operating to force air into the tank 152 to pressurize the tank and force liquid to flow in the conduit 156 to the beverage forming station 11. Again, liquid may be caused to flow from the tank 152 to the beverage forming station 11 in other ways, such as by opening the valve 151 to force additional unheated liquid into the tank 152, thereby displacing water out of the tank 152 and into the conduit 156. A flow sensor or other suitable device may be used to determine the amount of liquid delivered to the tank 152, and thus the amount of liquid delivered to the beverage forming station 11. Alternately, a pump may be used to force additional liquid into the tank 152, or to pump liquid from the tank 152 to the forming station 11. For example, a specified volume of liquid may be delivered to the forming station 152 by operating a pump to deliver the specified volume of liquid from the source W to the tank 152, e.g., a diaphragm pump may deliver 5 ml for each pump stroke, and thus 100 ml of liquid may be delivered to the tank 152 by operating the pump through 20 pump cycles. Liquid may be introduced to the beverage forming station 11 at any suitable pressure, e.g., 1-2 psi, 30-50 psi, or higher. Although in this embodiment the conduit 156 is shown as extending into the tank 152, the conduit 156 could be arranged in other suitable ways. For example, the outlet of the heater tank 152 to the conduit 156 could be arranged at an extreme top of the tank 152, or in other ways. The conduit 156 may include a check valve or other flow controller, e.g., to help prevent backflow in the tank conduit 156 from the forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the carafe 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

As noted above, the beverage forming apparatus 100 may include a detector 13 that detects whether the carafe 2 is at the carafe receiving area 12 by detecting the presence or absence of the magnetic element when the protrusion is received by the first recess 32. When the magnetic element is detected, the control circuit 16 may control the apparatus 100 to dispense the stored beverage from the holding tank to the carafe 2 in an amount greater than a threshold volume $V_T$. In some embodiments, the threshold volume $V_T$ is about 8 to 20 ounces and the apparatus 100 is configured to dispense 24 or 32 ounces of beverage, for example, only when the carafe is detected. If the carafe 2 is removed from the carafe receiving area 12 during beverage formation, and the magnetic element is no longer detected, the control circuit 16 may prevent the apparatus from dispensing any additional beverage. The apparatus 100 also may be configured to resume dispensing the beverage if the carafe 2 is thereafter returned to the carafe receiving area 12 (e.g., the magnetic element is redetected).

In embodiments in which the carafe 2 is not used or detected, the control circuit 24 may be configured such that the apparatus may dispense only a volume less than the threshold volume $V_T$ when the magnetic element is not detected (e.g., when the drip tray 40 is engaged with the housing 17). For example, in one embodiment, a container smaller than the carafe 2 may be associated with the housing 17, e.g., positioned at the carafe receiving area 12 and placed on the drip tray 40, to receive a volume of beverage less than the threshold volume $V_T$. In another embodiment, the carafe 2 may be positionable at the carafe receiving area 12 and placed on the drip tray (e.g., the protrusion 30 is not received in the first recess 32) to receive a volume of beverage less than the threshold volume $V_T$. In some embodiments, the apparatus 100 dispenses a volume less than about 8 to 20 ounces when the detector 13 detects the absence of the magnetic element (e.g., 8, 12, or 16 ounces of the beverage is dispensable).

As described above, the detector 13 may include one or more sensors (e.g., a reed switch, a hall effect switch, or another suitable switch) which are closed by reception of the protrusion 30 into the first recess 32. The control circuitry 16 may be arranged to suitably interpret any type of signal provided by the detector 13 to determine the presence or absence of the magnetic element and, thus, the carafe 2.

In some embodiments, the apparatus has a drip tray 40 for collecting excess or spilled beverage. The drip tray may have any suitable shape and may be formed of any suitable material as this aspect of the disclosure is not limited in this regard. Similar to the carafe 2, the drip tray 40 also may be placed on the same surface 19 that supports the machine 10 (see e.g., FIGS. 11A and 11B, which are perspective views of the carafe receiving area with the drip tray engaged and disengaged, respectively).

Figure 12:
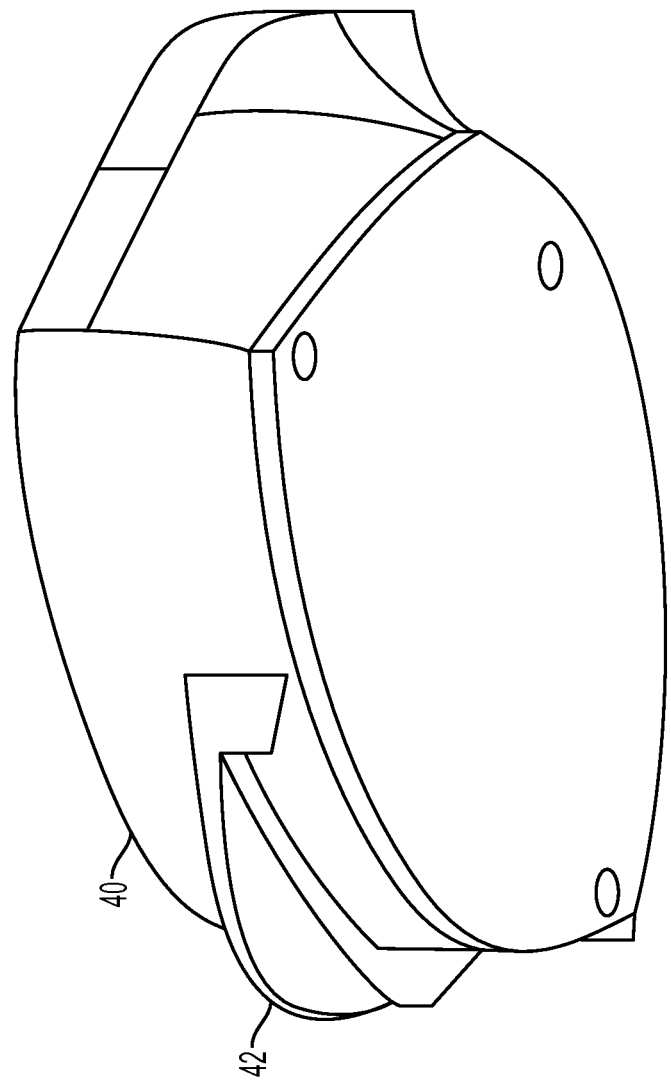
FIG. 12 is perspective view of a drip tray according to one embodiment.

As shown in FIG. 12, the drip tray 40 may have at least one engagement feature, such as a tab 42, for engaging the drip tray 40 with the housing 17. The drip tray 40 also may engage with the second recess 36 via other suitable engagement features, e.g., hooks, threads, notches, or latches. Similar to the protrusion 30, the engagement feature(s) may be permanently attached to the drip tray 40 in one embodiment, while in other embodiments the engagement feature(s) may be removably attachable to the drip tray 40. In some embodiments, the engagement feature(s) may be attached to the drip tray 40 via any suitable method. The engagement feature(s) also may be shaped, formed or otherwise constructed in any suitable way and of any suitable material. The engagement feature(s) also may have any suitable size. In some embodiments, the shape and size of the engagement feature(s) may correspond to the shape and size of the second recess 36. A person having ordinary skill in the art should appreciate that the drip tray need not include engagement features for engaging the drip tray but rather the drip tray may include a recess that is engaged with engagement features on the housing.

In some embodiments, the at least one engagement feature engages with the second recess 36 of the housing 17. A person having ordinary skill in the art should appreciate that the drip tray 40 cannot be engaged with the housing 17 when the carafe 2 is at the carafe receiving area 12 (e.g., the carafe 2 blocks access to the second recess 36 and prevents engagement between the engagement feature(s) and the second recess 36).

As shown in FIG. 12, the drip tray 40 may have more than one tab 42 for engaging with the second recess 36. In some embodiments, as is shown, the drip tray 40 has multiple tabs 42 that are connected to one another. In some embodiments, the position of the tab(s) or other engagement feature on the drip tray 40 correspond to the position of the second recess 36 or other complementary engagement feature on the housing 17. For example, the tab(s) 42 may be located at a same height above a bottom of the drip tray 40 as the second recess 36 is located above the bottom of the machine 10. Thus, the tab(s) 42 and the second recess 36 may be located at a same height above the surface 19 on which the machine 10 and drip tray 40 are supported.

Figure 13:
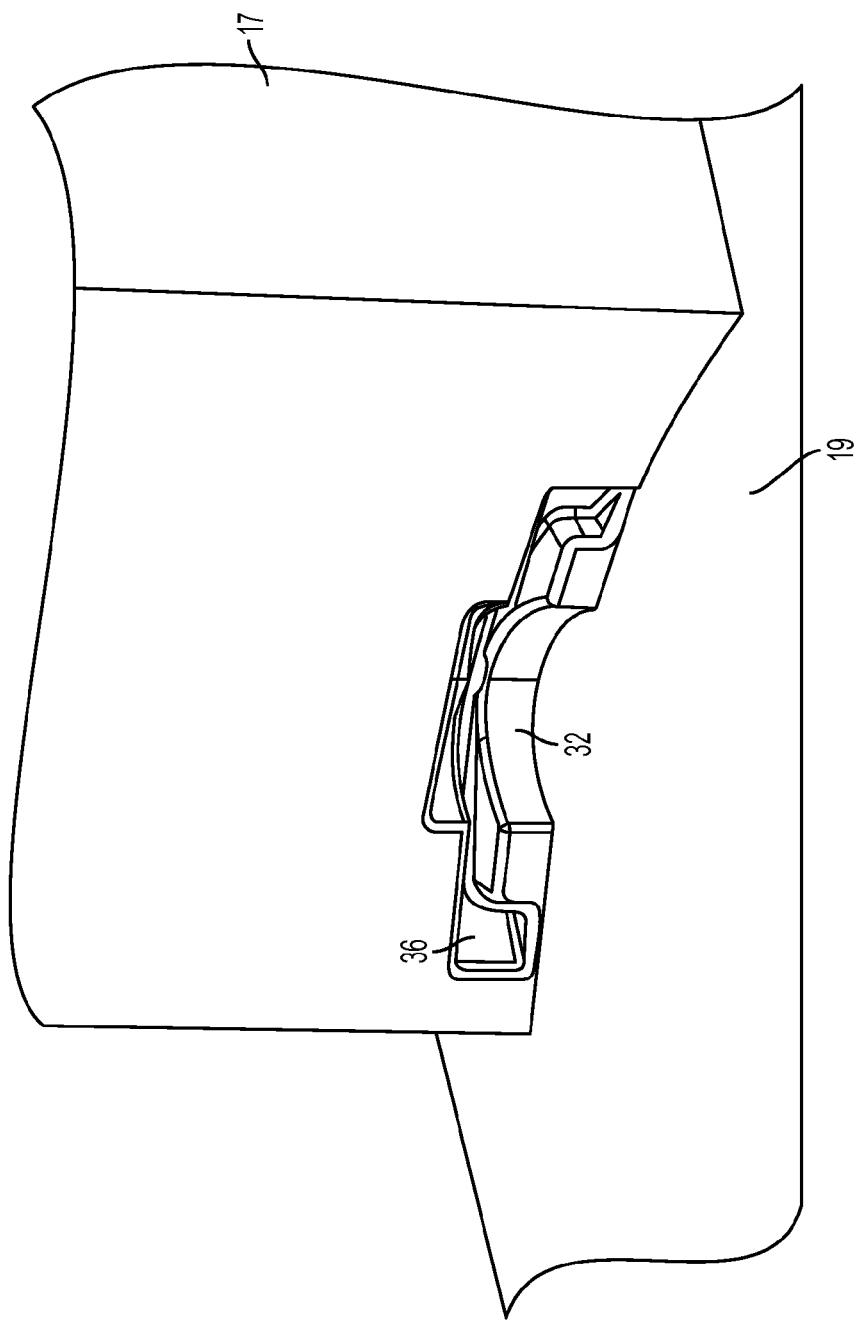
FIG. 13 is perspective view of a carafe receiving area according to one embodiment.

The tab(s) 42 on the drip tray 40 may be the same or a different shape than the protrusion 30 associated with the carafe 2. As shown in FIG. 13, in some embodiments, the location in which the protrusion 30 is received by the housing 17 (e.g., the first recess 32) is below the location in which the at least one tab 42 engages with the housing 17 (e.g., the second recess 36). The tab(s) 42 also may engage with the housing to the left, right, or below the location in which the protrusion 30 is received by the housing 17, as this aspect of the disclosure is not limited in this regard.

In some embodiments, the drip tray 40 is only attachable to the housing when the carafe 2 is not present (e.g., when the carafe 2 is disengaged from the housing). Similarly, the carafe may be engaged with the housing (e.g., the protrusion 30 may be received by the first recess 32) only when the drip tray 40 is disengaged from the housing 17. A person having ordinary skill in the art should appreciate that the carafe 2 also may be positionable at the receiving area via placement of the carafe 2 on the drip tray 40. In such an embodiment, the carafe 2 is not engaged with the housing 17 (e.g., the protrusion 30 is not received by the first recess 32), but the carafe 2 is still positioned to receive the beverage (e.g., in a volume less than the threshold volume $V_T$).

As shown in FIGS. 11-12, the drip tray 40 is not configured to notify the apparatus 100 or otherwise be detected by the machine 10 when the drip tray 40 is engaged with the housing 17. A person having ordinary skill in the art should appreciate, however, that the apparatus 100 may be configured with a second detector (not shown) to detect the presence of the drip tray 40, or the detector 13 may detect the presence of the drip tray as well as the carafe. In such an embodiment, the at least one tab 42 may comprise a magnetic element (similar to the protrusion 30) that is detected by at least one detector (e.g., a reed switch, a hall effect switch, or another suitable switch).

According to an aspect of the invention, a method for controlling a beverage forming apparatus may include placing a carafe at a carafe receiving area of a beverage forming machine where the carafe has a body defining an interior space for holding a beverage, an opening through which beverage is dispensable into the interior space, and a protrusion associated with a lower side portion of the carafe. In some embodiments, the apparatus includes a housing with a first recess and the protrusion of the carafe has a magnetic element. The carafe may be placed at the carafe receiving area such that the protrusion is inserted into the first recess. In some embodiments, when the protrusion is inserted into the first recess, the opening is positioned below an outlet for dispensing the beverage from the housing.

Next, the detector(s) may detect the presence or absence of the magnetic element (and, thus, the presence of the carafe at the carafe receiving area). If the magnetic element is not detected by the detectors, only operation of the beverage forming apparatus to dispense a volume of beverage less a threshold volume $V_T$ is enabled. In some embodiments, absence of the magnetic element enables only dispensing of a volume of less than about 8 to 20 ounces (e.g., 6, 8, 12, or 16 ounces of beverage). If the magnetic element is detected by the detectors, operation of the beverage forming apparatus to dispense a volume of beverage above the threshold volume $V_T$ is enabled. In some embodiments, detection of the magnetic element allows dispensing of a volume of beverage greater than about 8 to 20 ounces (e.g., 24 or 32 ounces of beverage). In embodiments in which the magnetic element is detected and the carafe is removed during beverage formation (e.g., presence of the magnetic element followed by absence of the magnetic element), operation of the beverage forming apparatus to dispense a beverage may be paused or stopped. In some embodiments, returning the carafe 2 to the beverage receiving area 2 (e.g., redetecting the magnetic element) may allow for beverage formation to resume.

Figure 14:
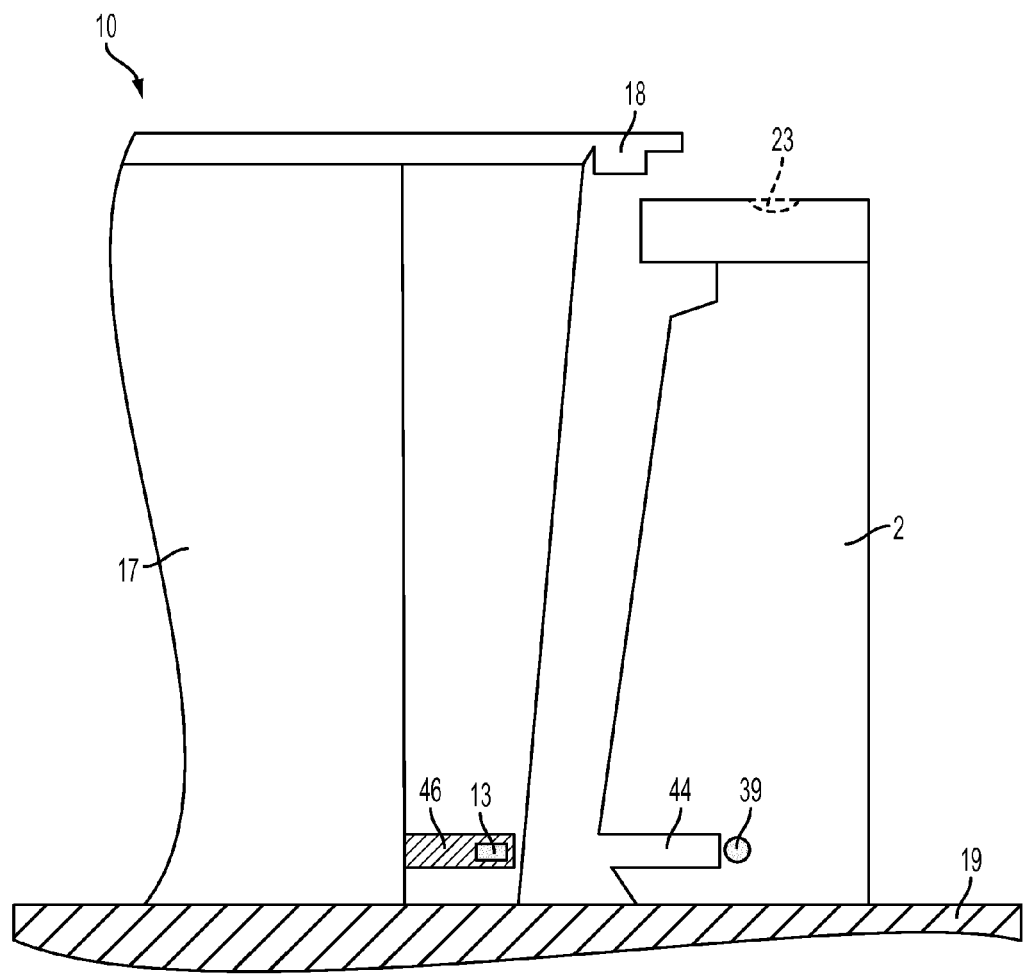
FIG. 14 is schematic side view of a beverage forming apparatus according to one embodiment.

Although various embodiments have been shown and described with the protrusion being associated with the carafe and the corresponding recess being formed in the housing, a person having ordinary skill in the art should appreciate that the protrusion may be associated with the housing and the corresponding recess may be formed in the carafe. As shown in FIG. 14, for example, the carafe 2 may have a recess 44, which, as is shown, may be formed in a lower side portion of the carafe 2, although the recess 44 may be formed in another suitable portion of the carafe 2 for receiving a protrusion 46. The protrusion 46 may be associated with a lower portion of the housing 17, or any other suitable portion of the housing 17. In at least some embodiments, the location of the protrusion 46 on the housing 17 corresponds to the location of the recess 44 in the carafe 2. As with other embodiments, the protrusion 46 and the recess 44 may have any suitable shape and size, and, in at least some embodiments, the shape and size of the protrusion 46 may correspond to the shape and size of the recess 44.

As illustrated in FIG. 14, the machine 10 may have at least one detector 13 for detecting the presence of the carafe. As is shown in this embodiment, the detector 13 may be located in the protrusion 46, although the detector 13 also may be located in another portion of the housing 17 suitable for detecting the presence of the carafe 2 (e.g., in an exterior surface of the housing adjacent to the protrusion 46). As with other embodiments, the detector 13 may detect the presence of a magnetic element in the carafe 2. As is shown in FIG. 14, the carafe 2 may include a magnet 39 located adjacent to the recess 44. Although the magnet 39 is shown behind the recess 44 (adjacent to an interior surface of the recess 44), the magnet 39 also may be placed above or below the recess 44. The magnet 39 also may be located adjacent to an exterior surface of the carafe 2. A person having ordinary skill in the art also should appreciate that other magnetic elements may be used (e.g., all or a portion of the interior surface of the recess 44 may be formed of a magnetic material). As with other embodiments, the detector 13 may only detect the carafe 2 (e.g., the switch is only closed) when the protrusion 46 is fully inserted into the recess 44 and the magnet 39 is in close proximity to the detector 13. Also similar to other embodiments, insertion of the protrusion 46 into the recess 44 may set the rotational position of the carafe 2 at the carafe receiving area 12. In some embodiments, when the detector 13 detects the presence of the magnetic element, the machine 10 is configured to dispense the stored beverage from the holding tank to the carafe in an amount greater than the threshold volume $V_T$.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a carafe 2. As will be understood by those of ordinary skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

A person having ordinary skill in the art should appreciate that the apparatus may be configured to receive cartridges of different sizes and/or cartridges having different amounts beverage medium to dispense different volumes of beverages to the carafe. For example, in some embodiments, the cartridge may be suitable for forming and dispensing more than about 20 ounces of beverage while in other embodiments the cartridge may be suitable for forming less than about 20 ounces of beverage. While two ranges of beverage volumes have been noted in these example, it should be appreciated that the cartridge may be configured and sized to dispense more or less volume of beverage as this aspect of the disclosure is not limited in this regard.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A beverage forming apparatus, the apparatus comprising:
 a beverage carafe having a body defining an interior space for holding a beverage, an opening through which the beverage is dispensable into the interior space, and a magnetic element associated with a lower portion of the carafe;

a housing having a carafe receiving area to receive the carafe and in which the carafe is associated with the housing to receive the beverage dispensed into the opening;

a protrusion associated with a lower side portion of one of the carafe and the housing;

a first recess for receiving the protrusion, the first recess being formed in the other of the carafe and the housing;

a detector arranged to detect the presence of the magnetic element when the protrusion is inserted into the recess;

a beverage forming station supported by the housing and arranged to combine a precursor liquid with a beverage material to form the beverage that is dispensed into the carafe at the carafe receiving area;

a liquid supply system supported by the housing for providing precursor liquid to the beverage forming station; and a control circuit arranged to control the liquid supply system to deliver precursor liquid to the beverage forming station to dispense more than a threshold volume of beverage only when the detector detects the magnetic element.

2. The apparatus of claim 1, wherein the protrusion is fixed to the carafe.

3. The apparatus of claim 1, wherein the protrusion includes a partial disc portion that extends from a side of the carafe.

4. The apparatus of claim 1, wherein the protrusion has a thickness of less than about 3 cm.

5. The apparatus of claim 1, wherein the protrusion is associated with the carafe and wherein the magnetic element comprises a magnet attached to the protrusion.

6. The apparatus of claim 1, wherein the protrusion is associated with the housing and wherein the detector is attached to the protrusion.

7. The apparatus of claim 1, wherein the control circuit is arranged to control the liquid supply system to deliver precursor liquid to the beverage forming station to dispense only less than the threshold volume of beverage when the detector does not detect the magnetic element, and wherein the threshold volume is about 8 ounces.

8. The apparatus of claim 1, wherein the first recess is formed in an exterior surface of the housing adjacent the carafe receiving area.

9. The apparatus of claim 1, wherein the first recess and the protrusion set a rotational position of the carafe when the protrusion is received in the first recess.

10. The apparatus of claim 1, wherein the carafe includes a circular opening at the top of the body and a cover arranged over the circular opening, the cover having a surface with the opening into which the beverage is dispensed.

11. The apparatus of claim 1, wherein the housing comprises an outlet for dispensing the beverage and wherein the opening is positioned below the outlet when the protrusion is inserted into the first recess.

12. The apparatus of claim 1, wherein the carafe includes a handle arranged on a side of the carafe, the handle being grippable by a user to lift the carafe.

13. The apparatus of claim 1, further comprising a drip tray arranged to engage with the housing at the carafe receiving area.

14. The apparatus of claim 13, wherein the first recess is associated with the housing and wherein the drip tray includes at least one engagement feature to engage with the housing.

15. The apparatus of claim 14, wherein the at least one engagement feature includes a tab that extends from the drip tray and has a different shape that the protrusion.

16. The apparatus of claim 14, wherein the housing includes a second recess for receiving the at least one engagement feature.

17. The apparatus of claim 16, wherein the first recess is located below the second recess.

18. The apparatus of claim 13, wherein the carafe is positionable to be received at the carafe receiving area with the protrusion received by the first recess only when the drip tray is removed.

19. The apparatus of claim 1, wherein the apparatus is supported by a surface and wherein the carafe is supported by the surface when the carafe is at the carafe receiving area and the protrusion is received at the first recess.

20. A method for controlling a beverage forming apparatus having a housing including a carafe receiving area to receive a carafe and one of a first recess and a protrusion associated with an exterior surface of the housing, the method comprising:

placing a carafe at the carafe receiving area, the carafe having a body defining an interior space for holding a beverage, an opening through which a beverage is dispensable into the interior space, the other of the first recess and the protrusion associated with a lower side portion of the carafe, and a magnetic element associated with a lower portion of the carafe;

inserting the protrusion into the first recess;

detecting the presence of the magnetic element; and controlling the liquid supply system to deliver a precursor liquid to a beverage forming station to dispense more than a threshold volume of beverage only when a detector detects the magnetic element.

21. The method of claim 20, wherein placing the carafe includes placing the carafe with the protrusion fixed to the carafe.

22. The method of claim 20, wherein placing includes placing the carafe having the associated protrusion and wherein detecting includes detecting a magnet attached to the protrusion.

23. The method of claim 20, wherein placing the carafe includes placing the carafe having a circular opening at the top of the body and a cover arranged over the circular opening, the cover having a surface with the opening into which the beverage is dispensed.

24. The method of claim 20, wherein placing the carafe at the carafe receiving area includes placing the carafe on a surface that supports the apparatus.

25. The method of claim 20, further comprising a drip tray, wherein placing the carafe at the carafe receiving area includes first disengaging the drip tray from the housing.

26. The method of claim 20, further comprising controlling the liquid supply system to deliver precursor liquid to the beverage forming station to dispense only less than the threshold volume of beverage when the detector does not detect the magnetic element, wherein the threshold volume is about 8 ounces.

27. A beverage forming apparatus, the apparatus comprising:

a beverage carafe having a body defining an interior space for holding a beverage, and an opening through which the beverage is dispensable into the interior space;

a housing having a carafe receiving area to receive the carafe and in which the carafe is associated with the housing to receive the beverage dispensed into the opening;

a detector arranged to detect the presence of the carafe when the carafe is at the carafe receiving area;

a beverage forming station supported by the housing and arranged to combine a precursor liquid with a beverage material to form the beverage that is dispensed from an outlet at the carafe receiving area;

a liquid supply system supported by the housing for providing precursor liquid to the beverage forming station; and a control circuit arranged to control the liquid supply system to deliver precursor liquid to the beverage forming station to dispense more than a threshold volume of beverage only when the detector detects the carafe, and arranged to control the liquid supply system to deliver precursor liquid to the beverage forming station to dispense only less than the threshold volume of beverage when the detector does not detect the carafe.

28. The apparatus of claim 27, wherein the threshold volume is about 8 ounces.

29. The apparatus of claim 27, further comprising a drip tray positionable at the carafe receiving area, and wherein the carafe is only detectable by the detector at the carafe receiving area if the drip tray is removed from the carafe receiving area.

30. The apparatus of claim 27, wherein the carafe includes a protrusion that extends from the carafe body, the housing includes a first recess arranged to receive the protrusion, and the detector is arranged to detect the carafe only when the protrusion is received in the first recess.

31. The apparatus of claim 27, wherein the housing includes a protrusion that extends from the housing, the carafe including a recess arranged to receive the protrusion, and the detector is arranged to detect the carafe only when the protrusion is received in the recess.

* * * * *